Feb. 17, 1931.    C. L. SNYDER    1,793,379
WHEEL CHOCK
Filed June 10, 1929    2 Sheets-Sheet 1
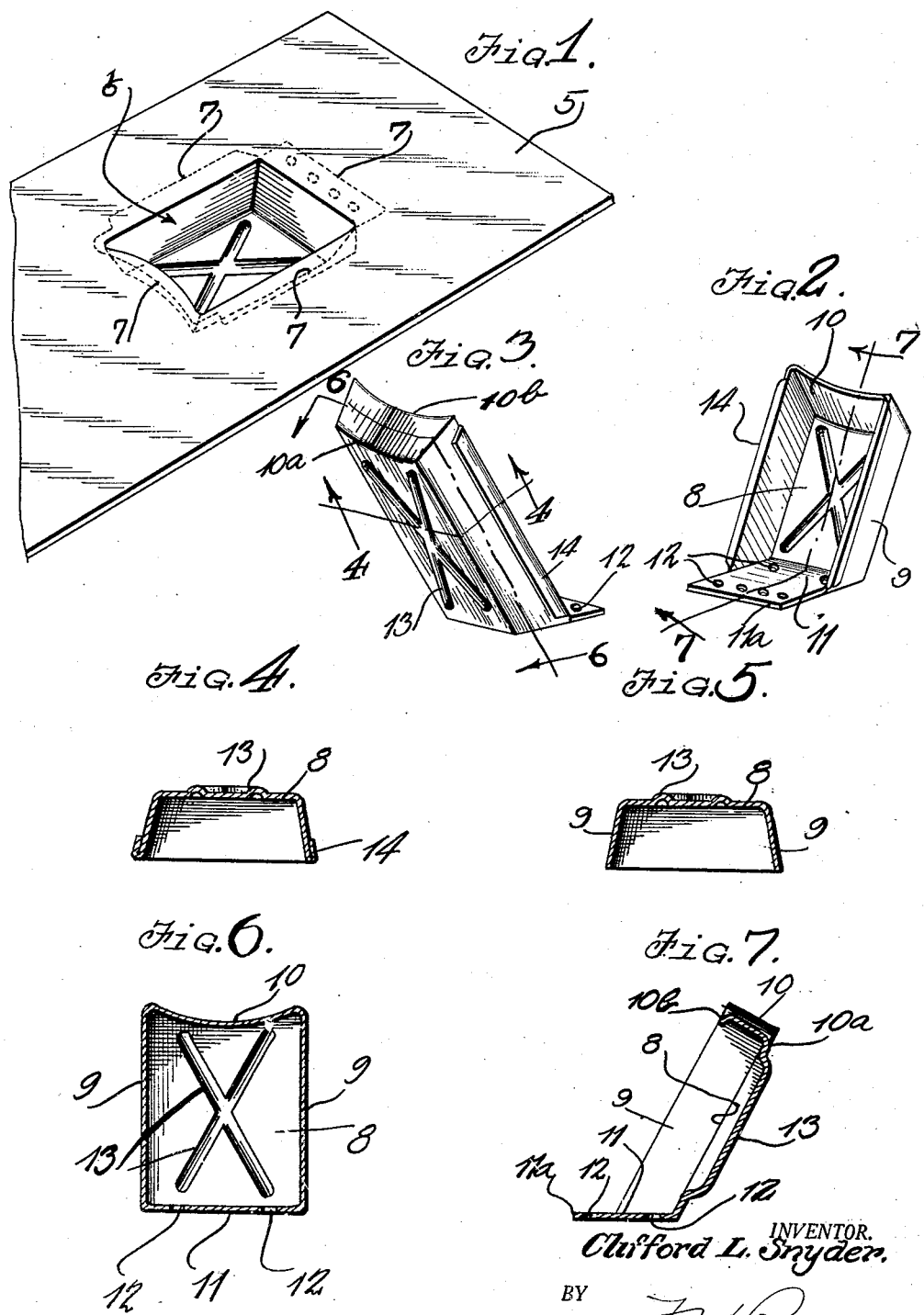

Feb. 17, 1931. C. L. SNYDER 1,793,379
WHEEL CHOCK
Filed June 10, 1929    2 Sheets-Sheet 2

INVENTOR.
Clifford L. Snyder.
BY
ATTORNEY.

Patented Feb. 17, 1931

1,793,379

UNITED STATES PATENT OFFICE

CLIFFORD L. SNYDER, OF DETROIT, MICHIGAN, ASSIGNOR TO THE EVANS AUTO LOADING CO., INC., OF DETROIT, MICHIGAN

WHEEL CHOCK

Application filed June 10, 1929. Serial No. 369,655.

This invention relates to certain new and useful improvements in wheel chocks.

The primary object of the invention is to provide a wheel chock especially designed for use in the shipment of motor vehicles in railway rolling stock wherein the motor vehicle is anchored or restrained against movement in a freight car, the chock being in the form of a pan-shaped block drawn from sheet steel or other metal and formed into the proper shape in the absence of such exigencies as welding, riveting or stamping.

Another object of the invention is to provide a wheel chock for use in the shipment of motor vehicles wherein the chock is drawn from sheet metal and of substantially receptacle formation carrying an anchor foot at one end with the other end transversely concaved and set at an angle to the adjacent engaged portion of the tire of the motor vehicle in normal position, the chock being mounted at an angle to the floor line of the car to cause the vehicle tire to ride onto the upper concaved end of the chock in shock absorbing position to engage the concaved end of the chock over its entire area and in line of the greatest resistance, certain portions of the chock being reinforced with ribs and beads for strengthening the same while a wire reinforcing element may be associated with the edge wall of the chock to prevent collapsing of the wall when under stress.

With the above and other objects in view which will become apparent as the nature of the invention is better understood, the same consists in the novel form, combination and arrangement of parts hereinafter more fully described, shown in the accompanying drawings and claimed.

In the drawings:—

Figure 1 is a fragmentary perspective view of the sheet metal blank showing the wheel chock forming the basis of this application, drawn therefrom;

Figure 2 is a front perspective view of the wheel chock showing the anchoring foot carried by one end;

Figure 3 is a rear perspective view showing the reinforcing rib in the bottom wall of the chock and the side edge reinforcing bead;

Figure 4 is a cross-sectional view taken on line 4—4 of Figure 3 showing the bottom ribs and side edge beads;

Figure 5 is a cross-sectional view similar to Figure 4 with the side edge beads eliminated;

Figure 6 is a vertical cross-sectional view taken on line 6—6 of Figure 3 showing the transversely concaved upper wall of the chock;

Figure 7 is a vertical cross-sectional view taken on line 7—7 of Figure 2;

Figure 12:
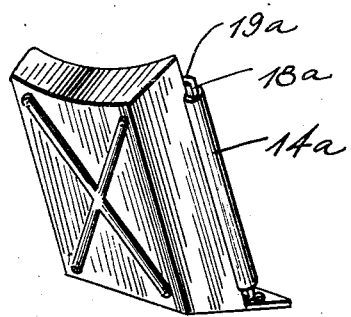
Figures 11 and 12 are front and rear perspective views respectively with the wire reinforcing element mounted on the chock.

The wheel chock is drawn from a sheet metal blank designated by the reference numeral 5 in Figure 1, the wheel chock generally designated by the reference numeral 6 being drawn from the blank and cut upon the dotted line 7, subsequently formed with side reinforcing beads and an end anchoring foot.

A complete chock is shown in detail in Figures 2 to 7 and being of pan-like or receptacle formation includes a front wall 8, side walls 9 and top and bottom walls 10 and 11 respectively, an anchoring foot 11a being carried by the bottom wall 11 and disposed in the same plane therewith. The side and end walls incline toward the bottom wall as illustrated to permit nesting of the chock during shipment and storage to facilitate handling thereof and also for occupying a minimum of space. The bottom wall 11 and anchoring foot 11a are provided with openings 12 for the passage of hold fast devices in anchoring the chock to a freight car floor or other support.

The sheet metal chock has certain portions thereof reinforced by ribbing and beading, the bottom wall 8 of the chock being provided with pressed out ribs 13 that may assume any preferred shape or design, while the free edges of the side walls 9 carry side flanges pressed against the side walls to form reinforcing beads 14.

Figure 8:
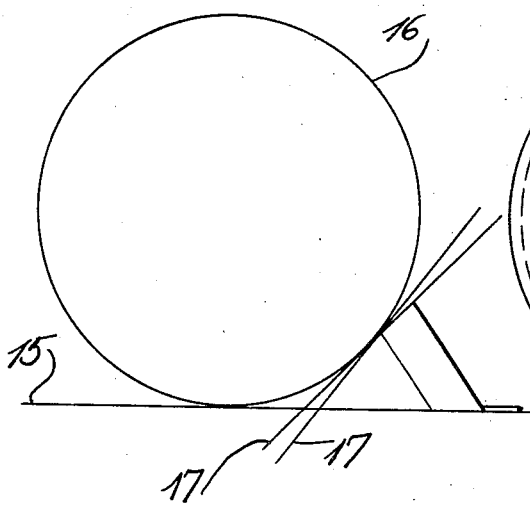
Figure 8 is a diagrammatic side-elevational view showing a wheel chock and wheel in normally mounted position with the forward edge of the upper end of the chock engaged with the wheel or tire.
Figure 9:
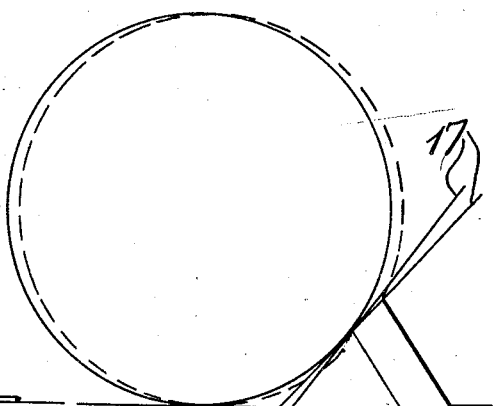
Figure 9 is a diagrammatic side elevational view similar to Figure 8, showing the wheel or tire in position and engaged with the upper concave face of the chock.

The top wall 10 of the chock is transversely concaved as shown in Figures 2, 3 and 6 and when anchored to a car floor or other support 15 as shown in Figures 8 and 9, the forward edge 10a of the top wall adjacent the bottom 8 is engaged with the vehicle wheel or tire 16 with the concaved face and edge 10b of the top wall 10 spaced from the wheel or tire 16. The normal position of the wheel chock relative to the wheel or tire 16 is shown in Figure 8 and the divergence of the concave face of the top wall 10 of the chock relative to the engaged part of the wheel or tire 16 is indicated by the lines 17. The angularity of the bottom wall 8 of the chock relative to the floor line 15 is such as to be in line with greatest stress or strain produced by movements of the vehicle or tire. The relative positions of the wheel chock and tire shown in Figure 9, show the tire moved beyond the forward edge 10a of the top wall 10 of the chock and engaged over the concave face for the full width thereof, the tire riding upwardly upon the upper end of the chock and encountering a flat abutment. By initially positioning the concaved face of the upper wall 10 of the chock at an angle to the surface of the tire as shown in Figure 8, the vehicle and tire are permitted limited movement to final shock absorbing position where a flat abutment is encountered for final arresting movement of the vehicle.

Figure 11:
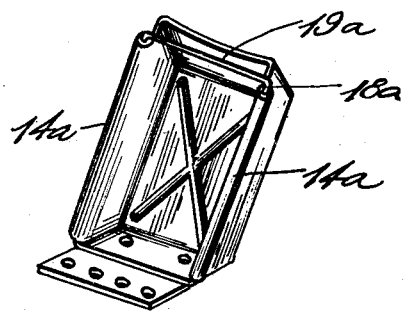
Figure 10:
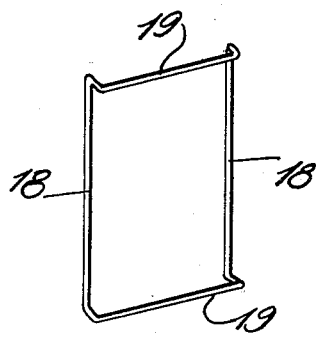
Figure 10 is a perspective view of a wire reinforcing element to be associated with the chock.

While the reinforcing ribs 13 formed in the bottom wall 8 of the chock and the side edge beads 14 strengthen the chock to prevent collapsing of the bottom and side walls under heavy strains, it is also intended further to reinforce these walls by the provision of the rectangular wire frame shown in Figure 10 to be associated with the side edge beads 14. The reinforcing wire frame comprises sides 18 and connecting ends 19, the sides 18 being confined by the side beads 14a as shown in Figures 11 and 12, while the lower connecting end 19 rests upon the anchoring foot 11a. The wire reinforce tends to prevent lateral and vertical collapse of the sides and end walls.

Figure 13:
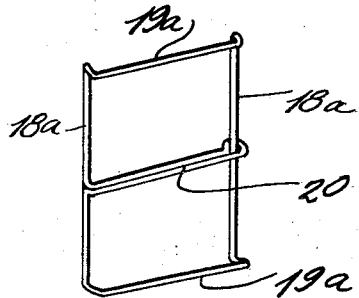
Figure 13 is a perspective view of another form of wire reinforcing element.

Another form of wire reinforcing frame for the chock is shown in Figure 13, the sides 18a being connected by the ends 19a and an intermediate cross-brace 20 holding the side walls 9 of the chock against spreading action.

From the above detailed description of the invention, it is believed that the construction and operation thereof will at once be apparent, and while there are herein shown and described the preferred embodiments of the invention, it is nevertheless to be understood that minor changes may be made therein without departing from the spirit and scope of the invention as claimed.

I claim:—

1. A wheel chock formed of drawn sheet metal and being of receptacle-like formation, having side and end walls inclined toward a bottom wall, reinforcing beads on certain edges of the walls of the chock, and a wire reinforcing frame having parts thereof inclosed by the beads.

2. A wheel chock formed of drawn sheet metal and being of receptacle-like formation, having side and end walls inclined toward a bottom wall, an anchoring foot carried by an end wall, reinforcing beads on certain edges of the walls of the chock, and a wire reinforcing frame having parts thereof inclosed by the beads.

3. A wheel chock formed of drawn sheet metal and being of receptacle-like formation, having side and end walls inclined toward a bottom wall, reinforcing beads on certain edges of the walls of the chock, a wire reinforcing frame having parts thereof inclosed by the beads, and means preventing lateral separation of the wire frame.

4. A wheel chock formed of drawn sheet metal and being of receptacle-like formation, having side and end walls inclined toward a bottom wall, an anchoring foot carried by an end wall, reinforcing beads on certain edges of the walls of the chock, a wire reinforcing frame having parts thereof inclosed by the beads, and means preventing lateral separation of the wire frame.

5. A sheet metal wheel chock of receptacle-like formation having side and end walls inclined toward a bottom wall, an anchoring foot integral with one end wall and the other end wall being transversely concaved for engagement with a wheel, and reinforcing means associated with the free edges of the side walls of the chock to prevent collapsing thereof.

6. A sheet metal wheel chock of receptacle-like formation having side and end walls inclined toward a bottom wall, an anchoring foot integral with one end wall and the other end wall being transversely concaved for engagement with a wheel, the chock being angularly disposed to cause the forward edge of the concaved wall to engage the wheel in normal position with the curved face of the concaved wall engaged by the wheel in shock position, and reinforcing means associated with the free edges of the side walls of the shock to prevent collapsing thereof.

7. A sheet metal wheel chock comprising a front wall, top, bottom and side walls inclined toward the front wall, and an anchor foot extending from the bottom wall and lying in the same plane therewith.

8. A sheet metal wheel chock comprising a front wall, top, bottom and side walls inclined toward the front wall, an anchor foot extending from the bottom wall and lying in the same plane therewith and the top wall being transversely concaved.

9. The combination with a wheel, of a sheet metal chock having one edge engaged with the surface of the wheel and the face of the chock adjacent said edge being concaved and normally spaced from the wheel and said wheel adapted to move into abutting engagement with the concaved face under abnormal conditions.

10. The combination with a wheel, of a sheet metal chock having side, top and bottom walls, and a front wall, an anchor foot carried by the bottom wall, one side edge of the top wall being engaged with the wheel and the face of the top wall being transversely concaved to receive the wheel under abnormal conditions.

11. The combination with a wheel, of a sheet metal chock having top and bottom walls, and a front wall, an anchor foot carried by the bottom wall, one side edge of the top wall being engaged with the wheel and the face of the top wall being transversely concaved to receive the wheel under abnormal conditions, and inclined in a direction to cause the wheel to move therefrom in assuming a normal position.

In testimony whereof I affix my signature.

CLIFFORD L. SNYDER.